United States Patent Office 3,410,892
Patented Nov. 12, 1968

3,410,892
3-ACYLOXYCYCLOBUTANONES
James C. Martin, Kingsport, Tenn., assignor to Eastman Kodak Company, Rochester, N.Y., a corporation of New Jersey
No Drawing. Filed Dec. 29, 1964, Ser. No. 422,047
8 Claims. (Cl. 260—476)

ABSTRACT OF THE DISCLOSURE

Ketenes are reacted with certain carboxylic acid esters of unsaturated alcohols to produce 3-acyloxycyclobutanone compounds which are useful, for example, as chemical intermediates in producing film-forming polymeric materials as well as plasticizers for vinyl resins.

This invention relates to a novel chemical reaction and to a novel class of 3-acyloxycyclobutanones obtained thereby.

The method and compounds of this invention are illustrated by the following equation:

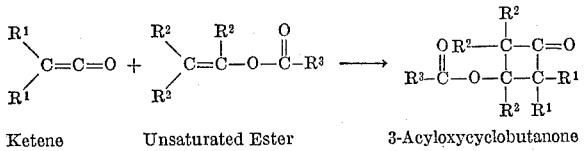

Ketene     Unsaturated Ester     3-Acyloxycyclobutanone

The ketenes employed in the reaction can include ketene, monosubstituted or "aldoketenes" and disubstituted or "ketoketenes" such as disclosed by Hanford and Sauer in "Organic Reactions," vol. III, R. Adams, Editor, John Wiley and Sons, Inc., New York, 1946, pp. 108–140. Thus suitable aldoketenes include methyl-, ethyl-, propyl-, n-butyl-, isobutyl, n-octyl-, 2-ethylhexyl-, monochloro-, carbethoxy-, acetoxy-, and phenoxyketene and the like. Suitable ketoketenes include dimethyl-, diethyl-, dipropyl-, methylpropyl-, butylethyl-, isobutylethyl-, dibutyl-, dihexyl-, dioctyl-, tetramethylene-, pentamethylene-, diphenyl-, methylphenyl-, and dichloroketene and the like.

The unsaturated esters suitable for our novel reaction include various vinyl esters and substituted vinyl esters of aliphatic and aromatic carboxylic acids. These include, for example vinyl acetate, vinyl propionate, vinyl butyrate, vinyl isobutyrate, vinyl n-decanoate, vinyl n-octanoate, vinyl 2-ethylhexoate, vinyl crotonate, vinyl acrylate, vinyl formate, vinyl laurate, vinyl methacrylate, vinyl phenylacetate, vinyl trifluoroacetate, vinyl trichloroacetate, vinyl benzoate, vinyl p-nitrobenzoate, vinyl p-methoxybenzoate, vinyl pivalate, vinyl chloroformate, vinyl stearate, vinyl α-naphthoate, vinyl β-naphthoate, vinyl p-chlorobenzoate, vinyl tetrachlorobenzoate, vinyl campholate, vinyl ethyl fumarate, vinyl ethyl oxalate, vinyl ethyl phthalate, isopropenyl acetate, isopropenyl isobutyrate, isopropenyl diphenyl acetate, 1-propenyl acetate, 2-methyl-1-propenyl acetate and the like.

Thus, my novel reaction applies to broad classes of ketenes and carboxylic acid esters of unsaturated alcohols, and the substituents $R^1$ and $R^2$ in the general equation above, taken singly, can be hydrogen, halogen or various organic substituents that are free of olefinic unsaturation. $R^3$ can also be hydrogen, halogen or various organic substituents, including unsaturated radicals as in the acrylic acid series. The most important of such substituents $R^1$ and $R^2$ are hydrogen, halogens, alkyl of up to about 12 carbon atoms, phenyl, and lower alkyl-substituted phenyl of up to about 12 carbon atoms. In addition, the two substituents $R^1$ of the ketene, taken collectively, can be joined alkylene groups that form with the carbon atom to which they are attached a 5- or 6-membered carboxylic ring, as in tetramethylene- and pentamethylene-ketene. The most important of the typical substituents $R^3$ include hydrogen, alkyl of up to 12 carbon atoms, especially lower alkyl, vinyl and lower alkyl-substituted vinyl, phenyl and naphthyl, halogen, halogen-substituted phenyl and halogen-substituted lower alkyl, e.g., as in trichloromethyl.

The method of the invention is carried out by mixing the ketene and the unsaturated ester at reaction temperature, preferably at 20 to 200° C. The upper end of this temperature range is used for the less reactive esters and ketenes. For example, diphenylketene is very reactive and will react with most of the vinyl and substituted vinyl esters at 20° C. or lower while with butylethylketene and other higher molecular weight ketenes temperatures of 200° C. and higher are used to achieve the desired rate of reaction.

Normally a 1:1 molar ratio of the reactants is used. However, in some instances a molar excess of the unsaturated ester is beneficial. This is particularly true when the dimerization of the ketene is rapid enough to be a competing reaction.

A solvent is not essential but it frequently is desirable to use one. Suitable solvents include aliphatic and aromatic hydrocarbons, chlorinated hydrocarbons, ethers, esters, nitriles, amides, etc., such as n-hexane, benzene, toluene, carbon tetrachloride, diethyl ether, ethyl acetate, dimethylformamide, butyronitrile, and the like.

The products of my invention are useful as chemical intermediates. For example, they can be reduced to 3-acyloxycyclobutanols which can then be esterified with acrylic acid, methacrylic acid or the like to obtain acrylic esters that are useful monomers for the preparation of polymers that can be used to form plastic molded articles, fibers and films. The reduction of the keto group is accomplished by hydrogenating the 3-acyloxycyclobutanone over a ruthenium or Raney nickel catalyst at 50 to 150°C. and 500 to 3,000 p.s.i. pressure. The resulting 3-acyloxycyclobutanol is then esterified by heating with acrylyl chloride or methacrylyl chloride in the presence of a hydrogen chloride acceptor such as pyridine or simply warming with the anhydride of acrylic or methacrylic acid. The acrylic ester can then be polymerized by heating in the presence of a peroxide catalyst, substantially as illustrated in Example 3 hereinafter. The latter example also illustrates that certain of the novel products can be directly polymerized, i.e., the products in which the 3-acyloxy group has olefinic unsaturation, as in acryloxy and methacrylyloxy. Certain of the products which are derived from trichloroacetic acid esters, e.g., 2,2-dimethyl-3-oxocyclobutyl trichloroacetate, are also useful as herbicides and bacteriocides. Still further the novel 3-acyloxycyclobutanones of my invention that are normally liquid are useful as plasticizers, e.g., for polyvinyl chloride and cellulose esters.

The method and products of the invention are further illustrated by the following examples.

EXAMPLE 1

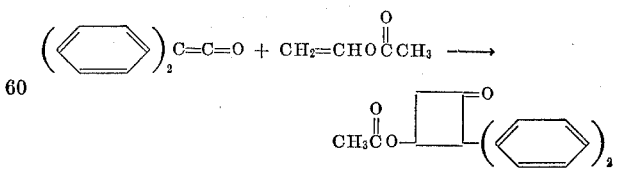

A mixture of 9.7 g. (.05 mole) of diphenylketene and 4.3 g. (.05 mole) of vinyl acetate was sealed in a flask under nitrogen. After several days the mixture crystallized. The solid was rinsed with cold hexane to give 11.4 g. of crude 3-oxo-2,2-diphenylcyclobutyl acetate. An analytical sample, recrystallized from a mixture of benzene and hexane, melted at 114–115.5°.

Analysis.—Calcd. for $C_{18}H_{16}O_3$: C, 77.1; H, 5.7; mol.

wt., 280. Found: C, 77.1; H, 5.8; mol. wt. (B.P. elevation in benzene), 280. Infrared maxima: 5.59 and 5.72μ.

EXAMPLE 2

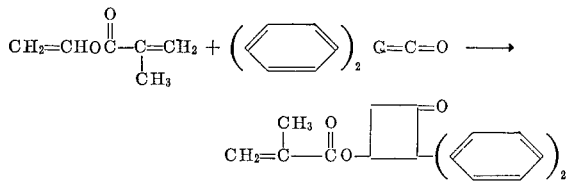

Using the same general technique as described in Example 1, 18.4 g. (0.1 mole) of diphenylketene and 11.2 g. (0.1 mole) of vinyl methacrylate gave 21.3 g. of methacrylic acid, 3-oxo-2,2-diphenylcyclobutyl ester.

*Analysis.*—Calcd. for C$_{20}$H$_{18}$O$_3$: C, 78.5; H, 5.9. Found: C, 78.4; H, 5.9.

The following example describes the polymer prepared from the monomer described in Example 2. This polymer has an unusually high softening point whereas other higher esters of methacrylic acid generally have low softening points (C. E. Schildknecht, Vinyl and Related Polymers, John Wiley and Sons, Inc., New York, 1952, pp. 229–234).

EXAMPLE 3

Ten grams of methacrylic acid, 3-oxo-2,2-diphenylcyclobutyl ester and 0.1 g. of benzoyl peroxide were placed in a small screw cap vial and heated for 48 hr. at 70°. A clear, hard polymer resulted that softened at 118–122°. This material could be molded into useful objects.

EXAMPLE 4

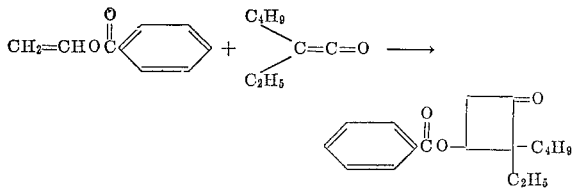

A solution of 74 g. (0.5 mole) of vinyl benzoate and 63 g. (0.5 mole) of butylethylketene in 200 ml. of acetonitrile was refluxed for 24 hr. Distillation of the reaction solution gave 60.4 g. of benzoic acid 2-butyl-2-ethyl-3-oxocyclobutyl ester, B.P. 104–106° (0.8 mm.).

EXAMPLE 5

$$CH_2=CHO\overset{O}{\overset{\|}{C}}CCl_3 + (CH_3)_2C=C=O \longrightarrow Cl_3C\overset{O}{\overset{\|}{C}}O{-}\square{-}(CH_3)_2$$

A mixture of 37.9 g. (0.2 mole) of vinyl trichloroacetate and 21 g. (0.3 mole) of dimethylketene was heated in a stainless steel rocking autoclave at 180° for 6 hr. The reaction product was filtered to remove dimethylketene dimer and distilled through a 6-in. Vigreux column to give 16.3 g. of trichloroacetic acid 2,2-dimethyl-3-oxo-cyclobutyl ester, B.P. 82–86° (0.5 mm.).

*Analysis.*—Calcd. for C$_8$H$_9$Cl$_3$O$_3$: Percent Cl, 41.1. Found: Percent Cl, 40.9.

EXAMPLE 6

$$\begin{matrix}C_4H_9\\C_2H_5\end{matrix}\!\!>\!\!C=C=O + CH_2=CHO\overset{O}{\overset{\|}{C}}CH_3 \longrightarrow CH_3\overset{O}{\overset{\|}{C}}O{-}\square\!\!\begin{matrix}-C_4H_9\\C_2H_5\end{matrix}$$

A mixture of 63 g. (0.5 mole) of butylethylketene and 43 g. (0.5 mole) of vinyl acetate was heated in an autoclave at 200° for 8 hr. Distillation of this material through a 6-in. Vigreux column gave some unchanged vinyl acetate, some butylethylketene dimer and 38.4 g. of 3-acetoxy-2-butyl-2-ethylcyclobutanone, B.P. 97° (0.5 mm.).

*Analysis.*—Calcd. for C$_{12}$H$_{20}$O$_3$: C, 67.9; H, 9.5. Found: C, 67.8; H, 9.4.

EXAMPLE 7

$$\begin{matrix}iso{-}C_4H_9\\C_2H_5\end{matrix}\!\!>\!\!C=C=O + CH_2=CHO\overset{O}{\overset{\|}{C}}CH_3 \longrightarrow$$

$$CH_3\overset{O}{\overset{\|}{C}}O{-}\square\!\!\begin{matrix}-iso{-}C_4H_9\\C_2H_5\end{matrix}$$

Under the general conditions of Example 6, 42 g. (0.33 mole) of ethylisobutylketene and 86 g. (1 mole) of vinyl acetate gave 21 g. of 3-acetoxy-2-ethyl-2-isobutylcyclobutanone, B.P. 82° (0.7 mm.).

*Analysis.*—Calcd. for C$_{12}$H$_{20}$O$_3$: C, 67.9; H, 9.5. Found: C, 67.7; H, 9.4.

EXAMPLE 8

Using the general procedure described in the above examples, the following ketenes and vinyl esters reacted to give the products shown:

| Ketene | Vinyl Ester | Product |
|---|---|---|
| (C$_6$H$_5$)$_2$C=C=O | CH$_2$=C(CH$_3$)—O$\overset{O}{\overset{\|}{C}}$CH$_3$ | CH$_3$$\overset{O}{\overset{\|}{C}}$O—☐—CH$_3$, (C$_6$H$_5$)$_2$ |
| (C$_6$H$_5$)$_2$C=C=O | CH$_3$CH=CH—O$\overset{O}{\overset{\|}{C}}$CH$_3$ | CH$_3$$\overset{O}{\overset{\|}{C}}$O—☐—CH$_3$, (C$_6$H$_5$)$_2$ |
| (C$_6$H$_5$)$_2$C=C=O | CH$_2$=CHO$\overset{O}{\overset{\|}{C}}$—(CH$_2$)$_{10}$CH$_3$ | CH$_3$(CH$_2$)$_{10}$$\overset{O}{\overset{\|}{C}}$O—☐—(C$_6$H$_5$)$_2$ |
| (C$_8$H$_{17}$)$_2$C=C=O | CH$_2$=C(CH$_3$)—O$\overset{O}{\overset{\|}{C}}$CH(CH$_3$)$_2$ | (CH$_3$)$_2$CH$\overset{O}{\overset{\|}{C}}$O—☐—(C$_8$H$_{17}$)$_2$, CH$_3$ |
| CH$_2$=C=O | CH$_2$=CHO$\overset{O}{\overset{\|}{C}}$—C(CH$_3$)$_3$ | (CH$_3$)$_3$C$\overset{O}{\overset{\|}{C}}$O—☐ |

| Ketene | Vinyl Ester | Product |
|---|---|---|
| $\begin{array}{c}C_6H_5\\ \diagdown\\ \phantom{xx}C{=}C{=}O\\ \diagup\\ CH_3\end{array}$ | $CH_2{=}CHO\overset{O}{\underset{\|}{C}}CH{=}CHCH_3$ | $CH_3CH{=}CH\overset{O}{\underset{\|}{C}}O$ 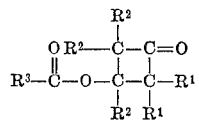 |
| $\begin{array}{c}\phantom{x}CH_2{-}CH_2\\ \diagup\phantom{xxxx}\diagdown\\ CH_2\phantom{xxxxxx}C{=}C{=}O\\ \diagdown\phantom{xxxx}\diagup\\ \phantom{x}CH_2{-}CH_2\end{array}$ | $CH_2{=}CHO\overset{O}{\underset{\|}{C}}H$ | $H\overset{O}{\underset{\|}{C}}O$ 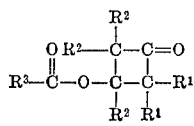 |

Although the invention has been described in considerable detail with particular reference to certain preferred embodiments thereof, it will be understood that variations and modifications can be effected within the spirit and scope of the invention as described hereinabove, and as defined in the appended claims.

I claim:

1. 3-acyloxycyclobutanones of the formula:

$$R^3-\overset{O}{\underset{\|}{C}}-O-\overset{\overset{\displaystyle R^2}{\|}}{\underset{\underset{\displaystyle R^2}{\|}}{C}}-\overset{\overset{\displaystyle C=O}{\|}}{\underset{\underset{\displaystyle R^1}{\|}}{C}}-R^1$$

wherein $R^1$ and $R^2$, taken singly, are selected from the group consisting of hydrogen, halogen, alkyl of up to about 12 carbon atoms, phenyl and lower alkyl-substituted phenyl of up to about 12 carbon atoms, the substituents $R^1$, taken collectively are joined alkylene groups that form with the carbon atom to which they are attached a 5- or 6-membered carbocyclic ring, and wherein $R^3$ is selected from the group consisting of hydrogen, halogen, alkyl of up to about 12 carbon atoms, vinyl, lower alkyl-substituted vinyl, phenyl, naphthyl, and halogen-substituted phenyl.

2. 3-acyloxycylobutanones of the formula:

$$R^3-\overset{O}{\underset{\|}{C}}-O-\overset{\overset{\displaystyle R^2}{\|}}{\underset{\underset{\displaystyle R^2}{\|}}{C}}-\overset{\overset{\displaystyle C=O}{\|}}{\underset{\underset{\displaystyle R^1}{\|}}{C}}-R^1$$

wherein $R^1$ and $R^2$ are selected from the group consisting of hydrogen, lower alkyl, and phenyl, and $R^3$ is selected from the group consisting of hydrogen, lower alkyl, phenyl, halogen-substituted lower alkyl, vinyl, and lower alkyl-substituted vinyl.

3. 3-oxo-2,2-diphenylcyclobutylacetate.
4. Methacrylic acid, 3-oxo-2,2-diphenylcyclobutyl ester.
5. Benzoic acid, 2-butyl-2-ethyl-3-oxocyclobutyl ester.
6. Trichloroacetic acid, 2,2-dimethyl-3-oxocyclobutyl ester.
7. 3-acetoxy-2-butyl-2-ethylcyclobutanone.
8. 3-acetoxy-2-ethyl-2-isobutylcyclobutanone.

References Cited

Hasek et al., Jour. of Org. Chem., vol. 29, pp. 1239–41, 1964. QD241J6.

Staudinger, Die Ketene, Ferdinand Enke, Stuttgart, Germany, 1912, pp. 56–59. QD305K2S8.

LORRAINE A. WEINBERGER, *Primary Examiner.*

T. L. GALLOWAY, *Assistant Examiner.*